(12) United States Patent
Kievit-Kylar

(10) Patent No.: US 11,132,406 B2
(45) Date of Patent: Sep. 28, 2021

(54) ACTION INDICATORS FOR SEARCH OPERATION OUTPUT ELEMENTS

(71) Applicant: Google LLC, Mountain View, CA (US)

(72) Inventor: Brent Joseph Kievit-Kylar, Sommerville, MA (US)

(73) Assignee: Google LLC, Mountain View, CA (US)

( * ) Notice: Subject to any disclaimer, the term of this patent is extended or adjusted under 35 U.S.C. 154(b) by 595 days.

(21) Appl. No.: 15/983,466

(22) Filed: May 18, 2018

(65) Prior Publication Data
US 2019/0354638 A1 Nov. 21, 2019

(51) Int. Cl.
| | |
|---|---|
| *G06F 16/00* | (2019.01) |
| *G06F 16/9038* | (2019.01) |
| *G06F 16/9032* | (2019.01) |
| *G06F 16/951* | (2019.01) |
| *H04L 29/08* | (2006.01) |

(52) U.S. Cl.
CPC .... *G06F 16/9038* (2019.01); *G06F 16/90324* (2019.01); *G06F 16/951* (2019.01); *H04L 67/22* (2013.01)

(58) Field of Classification Search
CPC ........... G06F 16/9038; G06F 16/90324; G06F 16/951; G06F 16/9532; G06F 16/9536; G06F 16/9538; G06F 16/156; G06F 16/248; G06F 16/338; G06F 16/438; G06F 16/638; G06F 16/738; H04L 67/22
See application file for complete search history.

(56) References Cited

U.S. PATENT DOCUMENTS

| | | | | |
|---|---|---|---|---|
| 7,831,548 | B1 * | 11/2010 | Round | G06Q 30/0241 |
| | | | | 707/609 |
| 7,966,334 | B1 * | 6/2011 | Bezos | G06Q 30/06 |
| | | | | 707/748 |
| 10,839,430 | B1 * | 11/2020 | Nath | G06Q 30/0277 |

(Continued)

FOREIGN PATENT DOCUMENTS

WO WO 2012/058594 5/2012

OTHER PUBLICATIONS

Yee et al., Faceted Metadata for Image Search and Browsing, 2003, 8 pages (Year: 2003).*

(Continued)

*Primary Examiner* — Noosha Arjomandi
(74) *Attorney, Agent, or Firm* — Dority & Manning, P.A.

(57) ABSTRACT

Methods, systems, and apparatus, including computer programs encoded on a computer storage medium, for receiving, responsive to a search query from a user device, search operation output elements based on a search operation performed in response to the search query, wherein each search operation output element is an element that can be displayed in a search results environment in which search operation output elements responsive to the search query are displayed to a user of the user device, and are each individually selectable by the user, determining whether to provide an action indicator for each search operation output element, and providing, to the user device for display in the search results environment, the search operation output elements, and for each search operation output element for which one or more action indicators are to be provided, action indicator data for the search operation output element.

21 Claims, 6 Drawing Sheets

(56) References Cited

U.S. PATENT DOCUMENTS

| | | | | |
|---|---|---|---|---|
| 10,839,431 B1* | 11/2020 | Nath | ................. | G06Q 30/0277 |
| 2005/0251444 A1* | 11/2005 | Varian | ................ | G06Q 30/0247 |
| | | | | 705/14.46 |
| 2011/0087661 A1* | 4/2011 | Quick | ................. | G06F 16/435 |
| | | | | 707/732 |
| 2011/0212430 A1* | 9/2011 | Smithmier | ............... | G09B 7/00 |
| | | | | 434/322 |
| 2012/0197732 A1* | 8/2012 | Shen | ..................... | G06Q 30/02 |
| | | | | 705/14.66 |
| 2013/0007792 A1* | 1/2013 | Jeon | ..................... | H04N 21/47 |
| | | | | 725/14 |
| 2013/0060756 A1* | 3/2013 | White | ............... | G06F 16/24575 |
| | | | | 707/722 |
| 2013/0276024 A1* | 10/2013 | Grant | ................ | G06Q 30/0269 |
| | | | | 725/34 |
| 2014/0019447 A1* | 1/2014 | Goryavskiy | .......... | G06F 16/951 |
| | | | | 707/732 |
| 2014/0067837 A1* | 3/2014 | Sadhuka | ............. | G06F 16/9535 |
| | | | | 707/758 |
| 2014/0172892 A1* | 6/2014 | Schechter | ............... | G06F 16/24 |
| | | | | 707/758 |
| 2014/0201237 A1* | 7/2014 | Kritt | ..................... | G06F 16/951 |
| | | | | 707/770 |
| 2014/0365466 A1* | 12/2014 | Chu | ...................... | G06F 16/337 |
| | | | | 707/722 |
| 2015/0046259 A1* | 2/2015 | Hicken | .............. | G06Q 30/0256 |
| | | | | 705/14.54 |
| 2015/0317319 A1* | 11/2015 | Andress | .............. | G06F 16/3322 |
| | | | | 707/722 |
| 2015/0356180 A1* | 12/2015 | Filiz | ....................... | G06Q 50/01 |
| | | | | 707/734 |
| 2016/0179801 A1* | 6/2016 | Venkataraman | ........ | G06F 16/48 |
| 2016/0189225 A1* | 6/2016 | Glover | ................ | G06F 16/9537 |
| | | | | 705/14.55 |
| 2017/0041296 A1* | 2/2017 | Ford | ..................... | G06F 16/951 |
| 2017/0116284 A1 | 4/2017 | Champaneria et al. | | |
| 2017/0359650 A1* | 12/2017 | Wexler | .................... | G06F 3/012 |
| 2018/0063334 A1* | 3/2018 | Nanjundan | ............. | H04L 12/14 |
| 2018/0255185 A1* | 9/2018 | Nanjundan | ......... | H04L 12/1403 |
| 2019/0340281 A1* | 11/2019 | Maiti | ................... | G06F 9/45558 |
| 2019/0354638 A1* | 11/2019 | Kievit-Kylar | ......... | G06F 16/951 |

OTHER PUBLICATIONS

PCT International Search Report and Written Opinion in International Application No. PCT/US2019/031985, dated Aug. 7, 2019, 13 pages.

\* cited by examiner

300

Receive search operation output elements based on a search operation performed in response to a search query from a user device
302

Determine whether to provide an action indictor for each search operation output element
304

Provide the search operation output elements to the user device for display in the search results environment, and for each search operation output element for which one or more action indicators are to be provided, provide action indicator data for the search operation output element
306

FIG. 3

ACTION INDICATORS FOR SEARCH OPERATION OUTPUT ELEMENTS

BACKGROUND

User devices provide access to a wide variety of information. For example, digital image files, video and/or audio files, as well as resources for particular subjects or particular news articles, are accessible over the Internet. This information may be viewed in web browsers running on a user device and native applications running on a user device. Search engines crawl and index these resources to facilitate searching of the resources. Thus, for just about any subject in which a user may be interested, there is a large amount of information that is readily available to the user.

A user may desire information related to content that a user is viewing on a user device. For search operations, such content may be search results (either textual or image), and query suggestions, for example. Such information may be provided in the form of an icon or some other annotation feature that is indicative of information the search system determines may be useful to the user.

SUMMARY

This specification describes technologies relating to action indicators for search operation output elements in a search results environment based on past aggregate behaviors.

In general, one innovative aspect of the subject matter described in this specification can be embodied in methods that include the actions of receiving, responsive to a search query from a user device, search operation output elements based on a search operation performed in response to the search query, wherein each search operation output element is an element that can be displayed in a search results environment in which search operation output elements responsive to the search query are displayed to a user of the user device, and are each individually selectable by the user, determining whether to provide an action indicator for each search operation output element, and providing, to the user device for display in the search results environment, the search operation output elements, and for each search operation output element for which one or more action indicators are to be provided, action indicator data for the search operation output element.

These and other embodiments can each optionally include one or more of the following features.

In some examples, the method includes determining whether to provide an action indicator for each search operation output element by obtaining data describing, for each user action of a plurality of user actions that are each different from each other, a percentage of users that performed the user action after selecting the search operation output element during a user session in which the search operation output element was selected by the user, determining, for each user action, and based on the percentage of users that performed the user action, whether to provide an action indicator with the search operation output element, wherein the action indicator indicates the user action and is different from action indicators for other user actions of the plurality of user actions, and for each user action for which the action indicator is determined to be provided, providing action indicator data that causes the action indicator to be displayed with the search operation output element.

In some examples, determining whether to provide an action indicator with the search operation output element for each user action and based on the percentage of users that performed the user action further includes determining whether the percentage of users that performed the user action exceeds a predetermined threshold. In some examples, determining whether to provide an action indicator with the search operation output element for each user action and based on the percentage of users that performed the user action further includes determining whether the percentage of users that performed the user action is an outlier. In some examples, determining whether the percentage of users that performed the user action is an outlier further includes determining whether the percentage of users that performed the user action is greater than one standard deviation from a mean percentage of users that end up in that outcome for data describing the other plurality of user actions.

In some examples, the plurality of user actions includes at least one of browsing related search results, saving a particular search result, sharing a particular search result, clicking to a host site related to a particular search result, and an amount of time spent on one particular search result.

In some examples, the search operation output elements are search results.

In some examples, the search operation output elements are search query suggestions.

In general, another innovative aspect of the subject matter described in this specification can be embodied in a system that includes a data processing apparatus and a non-transitory computer readable storage medium in data communication with the data processing apparatus and storing instructions executable by the data processing apparatus and upon such execution cause the data processing apparatus to perform operations. The operations include receiving, responsive to a search query from a user device, search operation output elements based on a search operation performed in response to the search query, wherein each search operation output element is an element that can be displayed in a search results environment in which search operation output elements responsive to the search query are displayed to a user of the user device, and are each individually selectable by the user, determining whether to provide an action indicator for each search operation output element, and providing, to the user device for display in the search results environment, the search operation output elements, and for each search operation output element for which one or more action indicators are to be provided, action indicator data for the search operation output element.

In some examples, the operation of determining whether to provide an action indicator for each search operation output element includes obtaining data describing, for each user action of a plurality of user actions that are each different from each other, a percentage of users that performed the user action after selecting the search operation output element during a user session in which the search operation output element was selected by the user, determining, for each user action, and based on the percentage of users that performed the user action, whether to provide an action indicator with the search operation output element, wherein the action indicator indicates the user action and is different from action indicators for other user actions of the plurality of user actions, and for each user action for which the action indicator is determined to be provided, providing action indicator data that causes the action indicator to be displayed with the search operation output element.

In some examples, the operation of determining whether to provide an action indicator with the search operation output element for each user action and based on the percentage of users that performed the user action includes determining whether the percentage of users that performed the user action exceeds a predetermined threshold. In some examples, the operation of determining whether to provide an action indicator with the search operation output element for each user action and based on the percentage of users that performed the user action can include determining whether the percentage of users that performed the user action is an outlier. In some examples, the operation of determining whether the percentage of users that performed the user action is an outlier can include determining whether the percentage of users that performed the user action is greater than one standard deviation from a mean percentage of users that end up in that outcome for data describing the other plurality of user actions.

In some examples, the plurality of user actions includes at least one of browsing related search results, saving a particular search result, sharing a particular search result, clicking to a host site related to a particular search result, and an amount of time spent on one particular search result. In some examples, the search operation output elements are search results. In some examples, the search operation output elements are search query suggestions.

In general, another innovative aspect of the subject matter described in this specification can be embodied in a non-transitory computer storage medium encoded with a computer program, the computer program including instructions that when executed by a data processing apparatus cause the data processing apparatus to perform operations. The operations include receiving, responsive to a search query from a user device, search operation output elements based on a search operation performed in response to the search query, wherein each search operation output element is an element that can be displayed in a search results environment in which search operation output elements responsive to the search query are displayed to a user of the user device, and are each individually selectable by the user, determining whether to provide an action indicator for each search operation output element, and providing, to the user device for display in the search results environment, the search operation output elements, and for each search operation output element for which one or more action indicators are to be provided, action indicator data for the search operation output element.

In some examples, the operation of determining whether to provide an action indicator for each search operation output element includes obtaining data describing, for each user action of a plurality of user actions that are each different from each other, a percentage of users that performed the user action after selecting the search operation output element during a user session in which the search operation output element was selected by the user, determining, for each user action, and based on the percentage of users that performed the user action, whether to provide an action indicator with the search operation output element, wherein the action indicator indicates the user action and is different from action indicators for other user actions of the plurality of user actions, and for each user action for which the action indicator is determined to be provided, providing action indicator data that causes the action indicator to be displayed with the search operation output element.

In some examples, the operation of determining whether to provide an action indicator with the search operation output element for each user action and based on the percentage of users that performed the user action includes determining whether the percentage of users that performed the user action exceeds a predetermined threshold. In some examples, the operation of determining whether to provide an action indicator with the search operation output element for each user action and based on the percentage of users that performed the user action can include determining whether the percentage of users that performed the user action is an outlier. In some examples, the operation of determining whether the percentage of users that performed the user action is an outlier can include determining whether the percentage of users that performed the user action is greater than one standard deviation from a mean percentage of users that end up in that outcome for data describing the other plurality of user actions.

In some examples, the plurality of user actions includes at least one of browsing related search results, saving a particular search result, sharing a particular search result, clicking to a host site related to a particular search result, and an amount of time spent on one particular search result. In some examples, the search operation output elements are search results. In some examples, the search operation output elements are search query suggestions.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. For machine learning, determining what actions are likely to be taken by users from the search results is a very difficult process. To train a system to accurately predict such outcomes can be very time consuming and resource intensive. Further, determining the actions that are best facilitated by an action indicator for a particular search operation output element (e.g., search results, search query suggestions, etc.) can be very difficult and prone to error.

In some implementations, action indicators (sometimes referred to herein as "badges") identify to the user follow-up actions performed by users after consuming a search operation output element. The follow-up action may be performed immediately after consuming the search operation element, or after one or more intermediate steps taken by the user after consuming the search operation element. This enables a user to receive additional information about possible actions to take in response to consuming a search operation element. Such information regarding actions that are likely to be performed in response to selecting the search output element include making a purchase, saving a photograph/video, tagging a photograph/video in social media, and the like.

In some implementations, crowd sourcing information of user data is used to determine which action indicator(s) should be provided for a given query. Emergent data from user logs can be used that are best descriptive and less susceptible to noise. In other words, this improvement is feature independent and more robust than a learned system that would need to be retrained. In addition, crowd sourcing based on user data obviates the need of machine learning process or examining individual web pages based on source code of resources.

Additionally, the action indicators, by providing users with an indication of an action that is frequently performed in response to a selection of the search operation output element, provide users with information that assists users in determining whether to select a particular search operation output element. This results in getting the user to a result faster, and in some cases, can get the user to a result they wouldn't otherwise reach. Further, action indicators can be used to teach users about new features that they would not otherwise know about (e.g., learn about a save action through the savable action indicator).

Moreover, using action indicators reduces the number of query processing cycles, as users are better informed with respect to information presented to them. This reduces processing resources required and reduces overall system bandwidth requirements (or, alternatively, enables a larger number of users to be serviced without a commensurate increase in processing resources). This improvement in the technological field of search processing is thus another distinct advantage realized by the systems and methods described below.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for using a search query evaluation and action indicator system.

Like reference numbers and designations in the various drawings indicate like elements.

DETAILED DESCRIPTION

Figure 1:
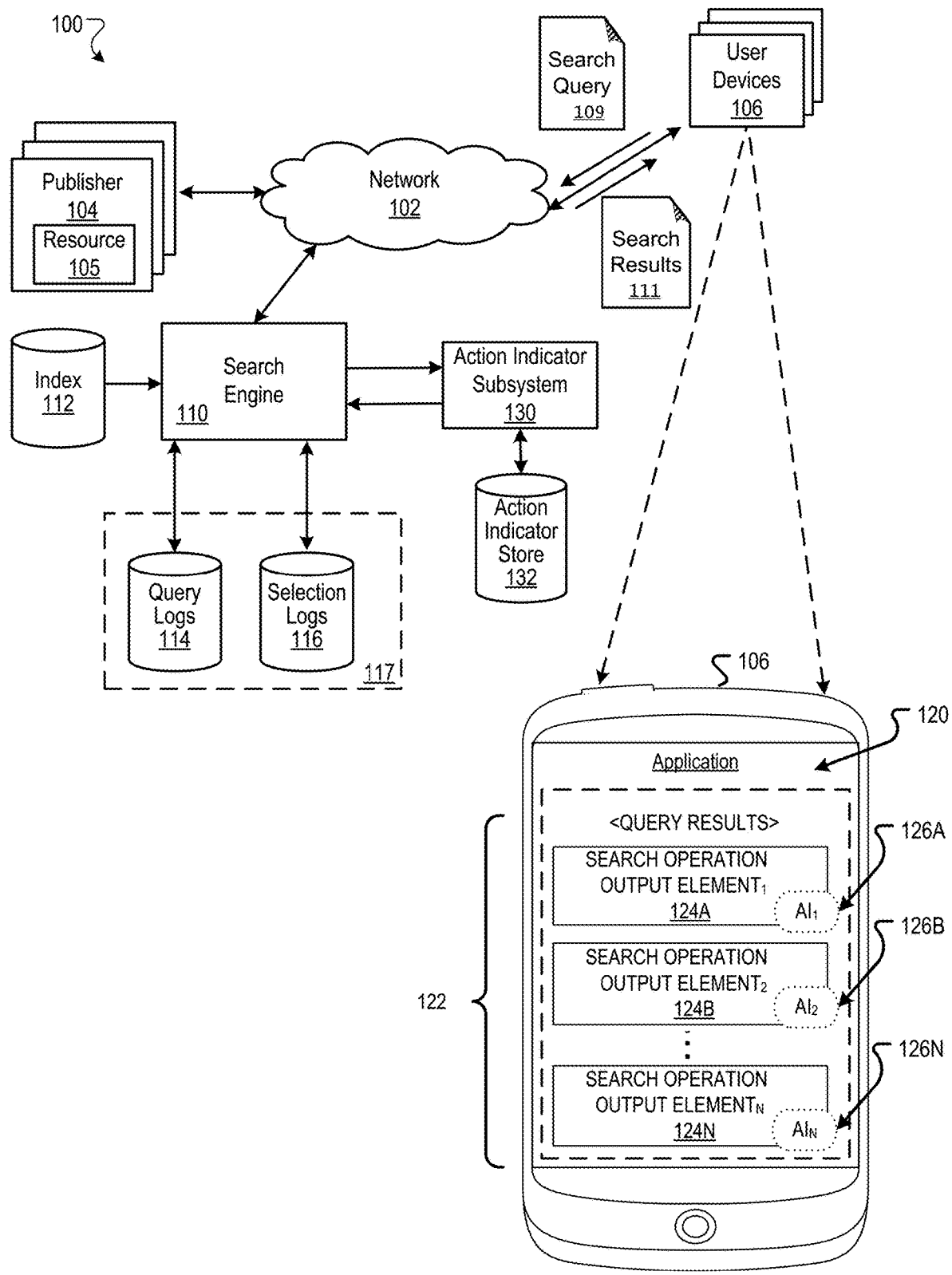
FIG. 1 is a block diagram of an example environment in which a search query evaluation and action indicator system can be implemented.

Systems, methods, and computer program products are described for receiving search operation output elements based on a search operation, and for each search operation output element, providing an action indicator based off of past aggregate usage of the search operation output element's downstream interactions. As used in this specification, a search operation output element is a selectable element provided for display on a user device in response to a search result, and, when selected, causes the invocation of another search operation or causes the user device to receive a resource. Examples of search operation output elements are query suggestions, textual search results, image search requests, and the like.

An action indicator is an element that is separate from a search operation output element that may be displayed with a search operation output element. An action indicator for a particular search operation output element indicates actions taken by users in response to selections of the search operation output element. For example, data can be obtained for each user action to determine a percentage of users that performed the user action after selecting the search operation output element. Based on the percentage of users that performed the user action, the system determines whether to provide and display an action indicator with the search operation output element.

In some implementations, the subject matter described in this specification uses crowd sourcing to indicate to the user what actions are most often performed in response to selecting the search operation output element by using action indicators. In some implementations, this technology can be used to badge guided "chip refinements" (query suggestions) from an image search that indicate refinement queries that a user can perform to get a more specific query. The badge is an action indicator that indicates types of actions previous users have performed after selecting a given guided chip. In some implementations, this technology can be used to badge each image from an image search, or badge each text result from a text search, where each badge is an action indicator.

In some implementations, some example actions that can be indicated by a badge include: saving media content, sharing media content, browsing several images or related media content, clicking to a host site (e.g., a host site that has a product), making a purchase, spending a certain amount of time viewing the media content, creating additional query refinements, or the like.

In some implementations, the process for creating the action indicators can include receiving data indicating a percentage of users whose actions performed are categorized into different potential outcomes for each of the action indicators. When there are multiple action indicators that may be selected to display, the system may determine to display all the action indicators. In other implementations, the system may select a particular action indicator based on one or more performance metrics. One such performance metric, which is determined for each action indicator, is based on a certain percentage of users that actually perform the action indicated by the action indicator. The percentage can be compared to a predetermined threshold. The threshold may be a fixed threshold, or may be an outlier threshold based on statistics for the action, e.g., greater than one standard deviation from the mean percentage of users that perform actions.

These features and additional features are described in more detail below.

FIG. 1 is a block diagram of an example environment 100 in which an action indicator system can be implemented in a search processing system. A computer network 102, such as a local area network (LAN), wide area network (WAN), the Internet, or a combination thereof, connects publisher web sites 104, user devices 106, and the search engine 110. The online environment 100 may include many thousands of publisher web sites 104 and user devices 106.

A publisher website 104 includes one or more resources 105 associated with a domain name and hosted by one or more servers. An example website is a collection of web pages formatted in hypertext markup language (HTML) that can contain text, images, multimedia content, and programming elements, such as scripts. Each publisher website 104 is maintained by a content publisher, which is an entity that controls, manages and/or owns the publisher website 104.

A resource is any data that can be provided by the publisher website 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device capable of requesting and receiving resources over the network 102. Example user devices 106 include personal computers, mobile communication devices, and other devices that can send and receive data over the network 102. A user device 106 typically includes a user application, such as a web browser or some other application, to facilitate the sending and receiving of data over the network 102. The user device 106 can present media using an application. Media is images, video, audio, text, or some combination of the like that a user consumes using an application running on a user device 106. The web browser can enable a user to display and interact with text, images, videos, music and other information typically located on a web page at a website on the World Wide Web or a local area network.

To facilitate searching of these resources 105, the search engine 110 identifies the resources by crawling the publisher web sites 104 and indexing the resources provided by the publisher web sites 104. The indexed and, optionally, cached copies of the resources, are stored in an index 112.

The user devices 106 submit search queries 109 to the search engine 110. The search queries 109 are submitted in the form of a search request that includes the search request. In response to the search request, the search engine 110 uses the index 112 to identify resources that are relevant to the queries. The search engine 110 identifies the resources in the form of search results 111 and returns the search results to the user devices 106 in search results page resource. A search result is data generated by the search engine 110 that identifies a resource that satisfies a particular search query, and includes a resource locator for the resource. An example search result can include a web page title, a snippet of text extracted from the web page, and the URL of the web page.

The search results are ranked based on scores related to the resources identified by the search results, such as information retrieval (IR) scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the publisher website 104 hosting the resource receives the request for the resource from the user device 106 and provides the resource to the requesting user device 106.

In some implementations, the queries 109 submitted from user devices 106 are stored in query logs 114. Click data for the queries and the web pages referenced by the search results are stored in selection logs 116. The query logs 114 and the selection logs 116 define search history data 117 that include data from and related to previous search requests associated with unique identifiers. The click logs define actions taken responsive to search output elements (e.g., search results, search query suggestions, and search query refinements) provided by the search engine 110. The query logs 114 and selection logs 116 can be used to map queries submitted by the user devices to these search output elements and resources they reference (e.g., web pages that were identified for search results) and the actions taken by users. The selection logs 116 and query logs 114 can thus be used by the search engine to determine the sequence of queries submitted by the user devices, the actions taken in response to the queries and search operation output elements, and how often the queries are submitted.

One way to enhance search operation output elements for a user is to provide action indicators that indicate what actions previous user have performed on different actions available to them. A particular user may then be informed as to an action that appears, based on the search history data 117, to be best facilitated or induced by the selection of a search operation output element. An action indicator subsystem 130 can be used to the create action indicators in the form of "badges" for search operation output elements to provide visual indications based off of past aggregate usage of previous users' downstream interactions.

For example, as depicted in FIG. 1, the user device 106 can present query results 122 using an application 120. The query results 122 can include search operation output elements 124A-124N (hereinafter generally referred to as search operation output elements 124). Each search operation output element 124 may have a corresponding action indicators (AI) 126A and 126B-126N (hereinafter generally referred to as action indicators 126). An example screenshot of a generic search for "lasagna" in a search application for a user device is depicted in FIG. 2.

Figure 2:
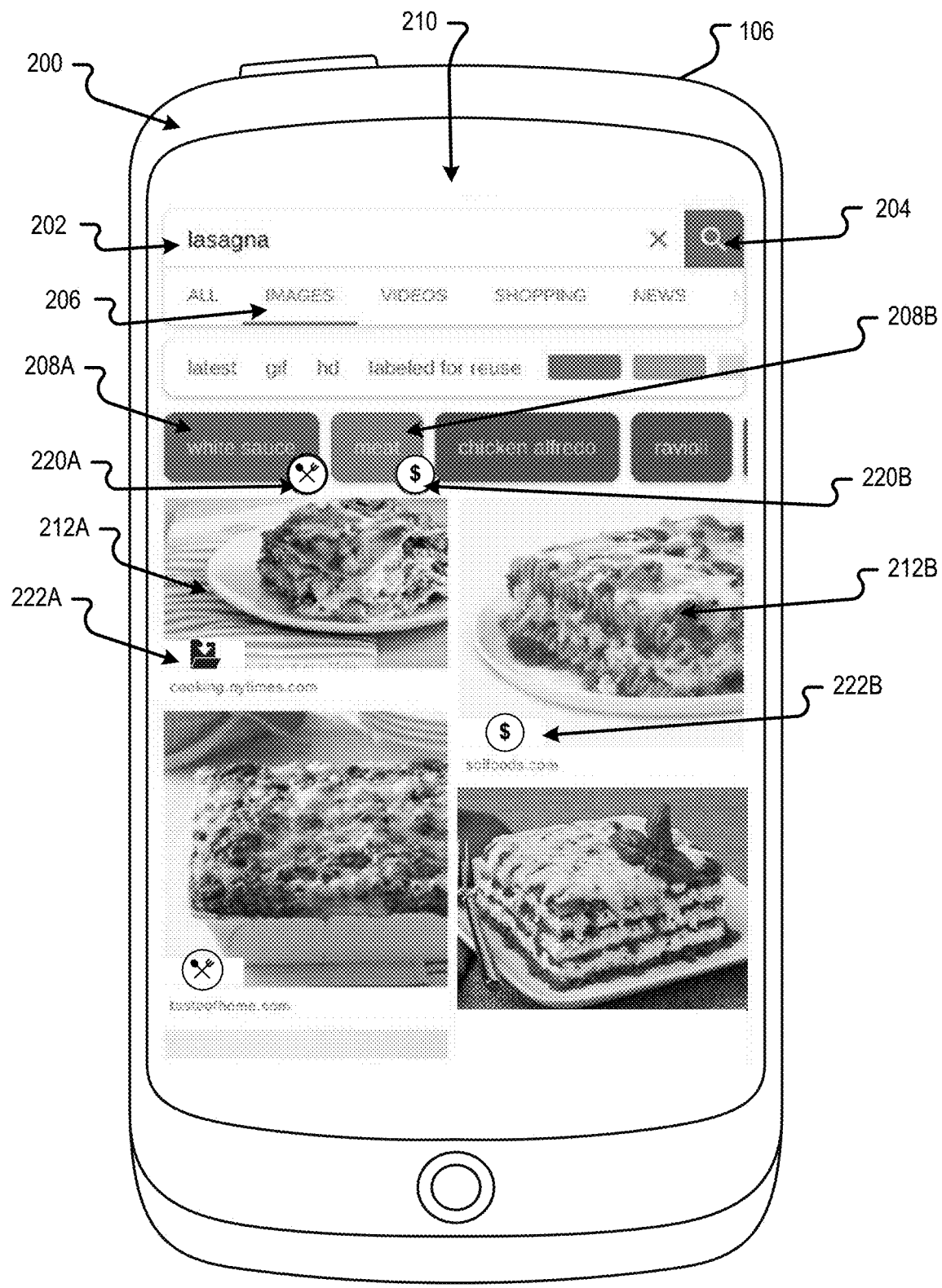
FIG. 2 is a screen shot of an example user interface presenting search operation output elements with action indicators from a search query.

FIG. 2 depicts screen shot 200 of an example user interface for presenting search operation output elements with action indicators from a search query. In the example screen shot 200, a user interface 210 of the user device 106 enables a user to perform a search operation in a search application. In particular, the user interface 210 enables the user to enter a query (i.e., "lasagna") into the search bar 202 and activate the search operation by selecting the search button 204. In this example, the user chose to search only images by selecting the images button 206, and the search operation then displays search operation output elements, such as search operation output elements 212A and 212B, images of lasagna from the search "lasagna". The search operation for the search application in this example also displays other search operation output elements 208A and 208B, which are shown in FIG. 2 as search query suggestions (e.g., guided chip refinements). The search operation output elements 208A and 208B may be selected by the user to further refine the search parameters.

In this example, the action indicator subsystem 130 creates action indicators 220A, 220B, 222A, and 222B to display as visual guide indicators/icons overlaid on the search operation output elements 208A and 208B. In particular, action indicator 220A is overlaid on search operation output element 208A with an icon of a crossed fork and spoon to signify to the user that a significant percentage of previous users who select that search query suggestion of "white sauce" were more likely to book a reservation at restaurants. The action indicator 220B is overlaid on search operation output element 208B with an icon of a dollar sign to signify to the user that a significant percentage of previous users who select that search query suggestion of "meat" were more likely to make a purchase for a product. Similarly, action indicator 222A is overlaid on search operation output element 212A (an image) with an icon of folder with a down arrow to signify to the user that a significant percentage of previous users who select that image were more likely downloading and/or saving an image (e.g., a recipe) as an end user action, while action indicator 222B is overlaid on image 212B with an icon of a dollar sign to signify to the user that a significant percentage of previous users who selected that image were more likely to make a purchase for a product. According to some implementations, different icons may be used to signify the above referenced user actions, and different icons may be used for different user actions.

Selection of action indicators for display with search operation output elements is now described with reference to FIGS. 3-5 below.

FIG. 3 is a flow diagram of an example process 300 for using a search query evaluation and an action indicator system. The process 300 can be implemented, for example, by the action indicator subsystem 130 of FIG. 1.

The process 300 receives search operation output elements based on a search operation performed in response to a search query from a user device (302). For example, the action indicator subsystem 130 of FIG. 1 can receive search results 111 responsive to the query 109 from the search engine 110.

The process 300 determines whether to provide an action indicator for each search operation output element (304). For example, the action indicator subsystem 130 of FIG. 1 identifies one or more action indicators that can be used for particular search results that meet certain criteria based on previous user behavior. An example process for determining and selecting action indicators is described with reference to FIG. 4 below.

The process 300 provides the search operation output elements to the user device for display in the search results environment, and for each search operation output element for which one or more action indicators are to be provided, provide action indicator data for the search operation output element (306). For example, the action indicator subsystem 130 of FIG. 1 can, for each search operation output element that was determined to provide an action indicator, display an action indicator overlaid on each particular search operation output element. For example, as shown in FIG. 2, action indicator 222A is overlaid on search operation output element 212A, and action indicator 220B is overlaid on search operation output element 208B. In some implementations, an action indicator can be overlaid on every search operation output element.

Figure 4:
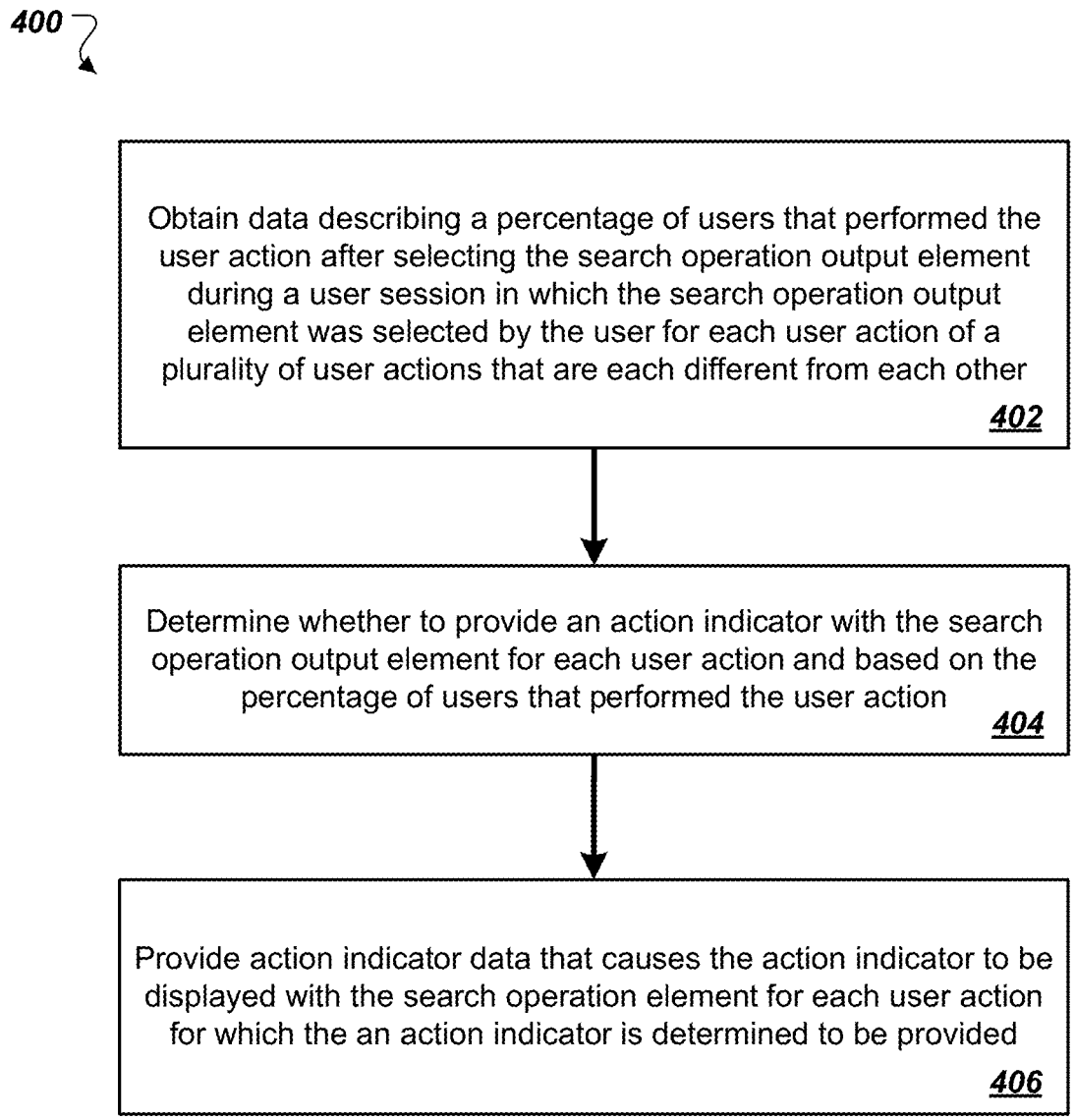
FIG. 4 is a flowchart of an example process for using a search query evaluation and action indicator system.

FIG. 4 is a flow diagram of an example process 400 for using a search query evaluation and an action indicator system. The process 400 can be implemented, for example, by the action indicator subsystem 130 of FIG. 1. The process 400 is one example process for determining whether to provide action indicators for search operation output elements.

The process 400 obtains data describing a percentage of users that performed the user action after selecting the search operation output element during a user session in which the search operation output element was selected by the user for each user action of a plurality of user actions that are each different from each other (402). For example, the action indicator subsystem 130 of FIG. 1 can obtain the user action data from the search engine 110, which can mine the user action data from the query logs 114 and/or the selection logs 116 of the search history data 117. The user action data can include data indicating the resulting actions of previous users that are performed after selecting search operation output elements. For example, for a resource, data describing actions taken by users after search results referencing the resource may be stored in the query logs 114 and selection logs 116.

The actions taken may be aggregated for all queries for a resource, or, alternatively, may be partitioned based on different queries for a resource. For example, for a particular resource, search results referencing the resource provided in response to all queries have been selected 10,000 times, of those 10,000 selections, 4,000 purchases were made after the resource was provided to a user device. That action data may thus indicate 4,000 purchases for the resource. Alternative, assume that three queries have been used to identify the resource—Query A, Query B, and Query C. Of the 10,000 selections and 4,000 purchases, 5,000 selections and 3,500 purchases were in response to Query A; 3,000 selections and 400 purchases were in response to Query B; and 2,000 selections and 100 purchases were the result of Query C. The action data may thus be partitioned to indicate the aggregate values on a query/resource pair.

For search suggestions, user action data may be aggregated based on the search suggestion and may be inclusive of all resources provided in response to the search suggestion. Such user action data can include, for example, saving media content, sharing media content, browsing several images or related media content, clicking to a host site (e.g., a host site that has a product), making a purchase, spending a certain amount of time viewing the media content, creating additional query refinements, or the like. According to some implementations, the action indicator subsystem 130 of FIG. 1 includes a data storage system, the action indicator store 132, which can store the user action data obtained from the search engine 110. Thus, the action indicator subsystem 130 of FIG. 1 can obtain the user action data from the action indicator store 132.

Each user session is a set of user interactions for a particular user that are grouped together for analysis. The user sessions can include user interactions that occurred within a threshold period of time (e.g., within 1 hour, 1 day, or 1 month) or be delineated using specified actions. For example, a user search session can include user search queries and subsequent actions that occur over a 1 hour period and/or occur prior to a session ending event (e.g., closing of a search browser). Because the actions are determined on session data, an action may be attributed to a search operation output element even if the action is not performed after data responsive the search operation output element is provided. For example, a search result may link to a first resource that, in turn, links to a second recourse at which a reservation can be made. Selection of the search result, and the selection of the second resource form the first resource and the making of a reservation may thus result in the reservation action being attributed to the first resource.

The process 400 determines, after obtaining the data describing a percentage of users that performed the user action and based on that percentage of users, whether to provide an action indicator with the search operation output element for each user action (404). For example, the action indicator subsystem 130 of FIG. 1 can evaluate the data obtained describing the percentage of users that performed the user action to determine whether an action indicator exceeds certain thresholds. An example process of the action indicator subsystem 130 determining whether to provide an action indicator with the search operation output element is further described below with process 500 of FIG. 5.

The process 400 provides action indicator data that causes the action indicator to be displayed with the search operation element for each user action for which the action indicator is determined to be provided (406). For example, the action indicator subsystem 130 of FIG. 1 can display, as shown on FIG. 2, the action indicator 220A as overlaid on search operation output element 208A.

Figure 5:
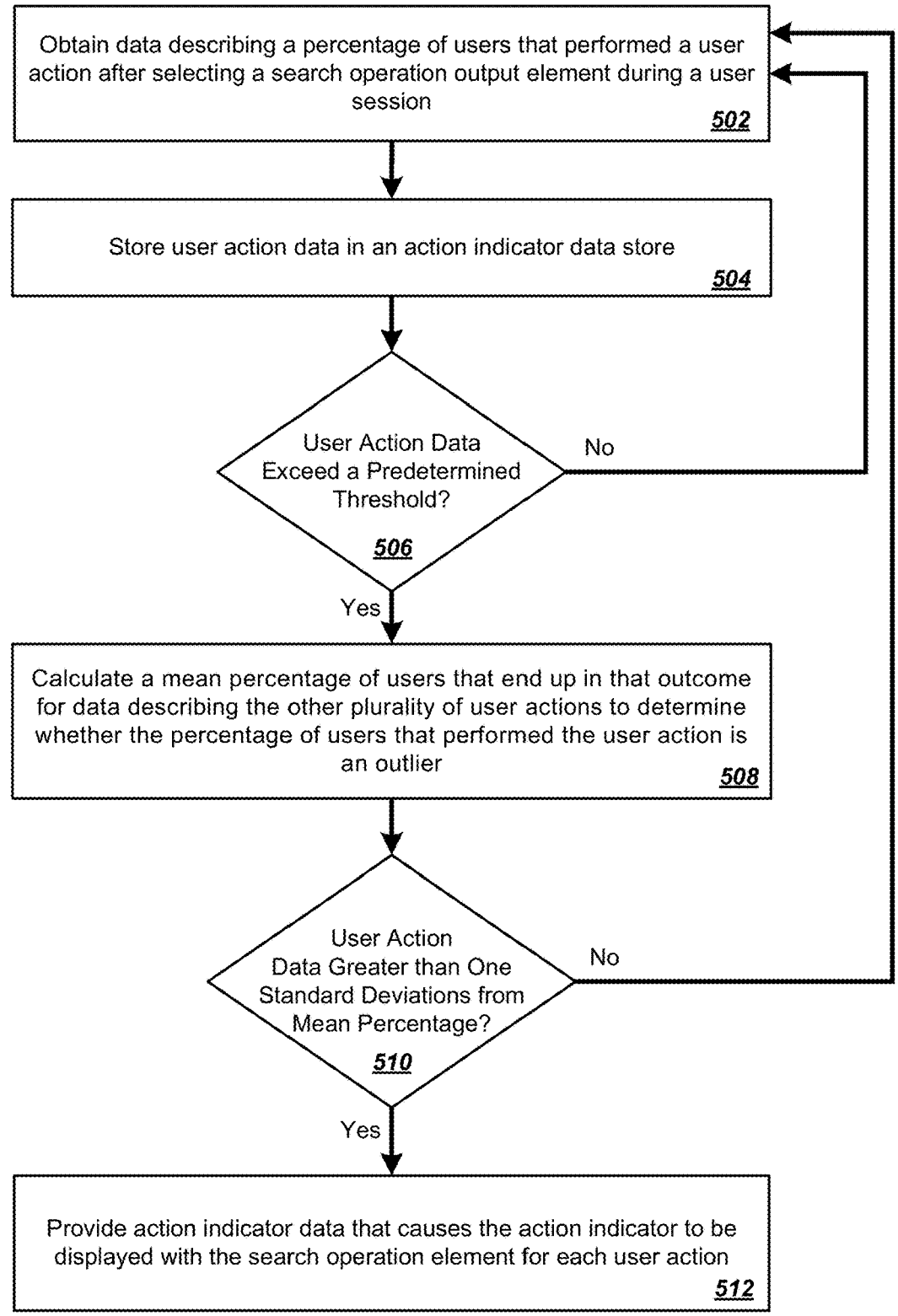
FIG. 5 is a flowchart of an example process for using a search query evaluation and action indicator system.

FIG. 5 is a flow diagram of an example process 500 for using a search query evaluation and an action indicator system. The process 500 can be implemented, for example, by the action indicator subsystem 130 of FIG. 1.

The process 500 obtains data describing a percentage of users that performed a user action after selecting a search operation output element during a user session (502). For example, the action indicator subsystem 130 of FIG. 1 can obtain the user action data from the search engine 110, which can mine the user action data from the query logs 114 and/or the selection logs 116, or the action indicator subsystem 130 of FIG. 1 can obtain the user action data from the action indicator store 132.

The process 500 stores user action data in an action indicator data store (504). For example, the action indicator subsystem 130 of FIG. 1, can store the user action data from the action indicator store 132 after obtaining the user action data from the search engine 110.

A determination is made as to whether the user action data exceeds a predetermined threshold (506). If the user action data does not exceed the predetermined threshold, the process 500 returns to stage 502 of obtaining additional data describing a percentage of users that performed a user action after selecting a search operation output element during a user session. If the user action data does exceed the predetermined threshold, the process 500 proceeds to stage 508. For example, the action indicator subsystem 130 of FIG. 1 can obtain the user action data and compare that to a threshold that was set by the system.

In some implementations, the threshold could be static and predetermined by the action indicator subsystem 130. In some implementations, different thresholds can be established based on the specific user action. In some implementations the action indicator subsystem 130 can dynamically update the threshold based on an indication that too many action indicators are displayed on a particular search results. For example, if the action indicator subsystem 130 determines that a certain percentage of search operation output elements would meet or exceed the threshold (e.g., greater than 80%), then the action indicator subsystem 130 can raise the threshold value to decrease the number of action indicators for the search operation output elements. However, if there are no action indicators or a very a small number of action indicators to be displayed for the search operation output elements (e.g., less than two), the action indicator subsystem 130 can lower the threshold value to increase the number of action indicators that meet the threshold.

A mean percentage of users that end up in that outcome for data describing the other plurality of user actions is calculated to determine whether the percentage of users that performed the user action is an outlier (508). For example, the action indicator subsystem 130 calculates an average percentage of data for a particular user action across a plurality of search operation output elements. An example of this implementation if further described below with reference to Table 1 and Table 2.

The process 500 determines whether the user action data is greater than one standard deviation from the calculated mean percentage (510). If the user action data is not greater than one standard deviation from the mean percentage, the process 500 returns to stage 502 of obtaining additional data describing a percentage of users that performed a user action after selecting a search operation output element during a user session. If the user action data is greater than one standard deviation from the mean percentage, the process 500 proceeds to stage 512. According to some implementations, the action indicator subsystem 130 could show action indicators that comply with different parameters. For example, the user action data must be greater than two standard deviations from the mean percentage in order to show an action indicator on the respective search operation output element.

According to an exemplary implementation, if there were three search operation output elements, i.e., A, B, and C, and there were three possible user actions, i.e., X, Y, and Z, the following table below presents a possible example of user action data that may be evaluated by the action indicator subsystem 130:

TABLE 1

|  | A | B | C |
|---|---|---|---|
| X | 20% | 0% | 5% |
| Y | 0% | 0% | 0% |
| Z | 0% | 10% | 0% |
| None | 80% | 90% | 95% |

In this example of user action data, assume the threshold value of 10% is used by the action indicator subsystem 130 to determine if the user action data meets or exceeds that threshold. According to some implementations, as discussed herein, other values for the threshold may be used. Referring back to the example above, the action indicator subsystem 130 would first process the user action data, and determine which combination of output elements and user actions exceed the threshold value of 10%. In this example, search operation output element A for the user action X, and search operation output element B for the user action Z would proceed to the next stage in the process.

Next, the action indicator subsystem 130 would calculate the mean percentage of user action data for each data point in the table that exceeds the threshold, and determine whether to place an action indicator on the search operation output element, if the percentage is more than one standard deviation from the mean. For example, the row for user action X has 20%, 0%, and 5% for the search operation output elements A, B, and C, respectively. The mean for user action X is approximately 8.3% and the standard deviation is approximately 10.4%. Therefore 20%, the obtained percentage for search operation output element A for the user action X, is more than one standard deviation from the mean and an action indicator could be shown (as shaded above) for search operation output element A for the user action X.

According to another example of user action data, assume the row for user action X has 20%, 20%, and 10% for the search operation output elements A, B, and C, respectively. The mean for user action X would then be approximately 16.7% and the standard deviation would then be approximately 5.8%. In this example then 20%, the obtained percentage for search operation output element A for the user action X, is not more than one standard deviation from the mean and an action indicator would not be shown. According to some implementations, the action indicator subsystem 130 can use different methods of determining when to place an action indicator based on the same parameters, or may obtain different data from the search engine to evaluate the user actions.

The process 500 provides action indicator data that causes the action indicator to be displayed with the search operation element for each user action (512). For example, the action indicator subsystem 130 of FIG. 1 can display, as shown on FIG. 2, action indicator 220A as overlaid on search operation output element 208A, to alert the user of the user device 106, that the search operation output element 208A, a suggested chip refinement query, that a significant percentage of other users who selected that element previously had made the specified user action.

Figure 6:
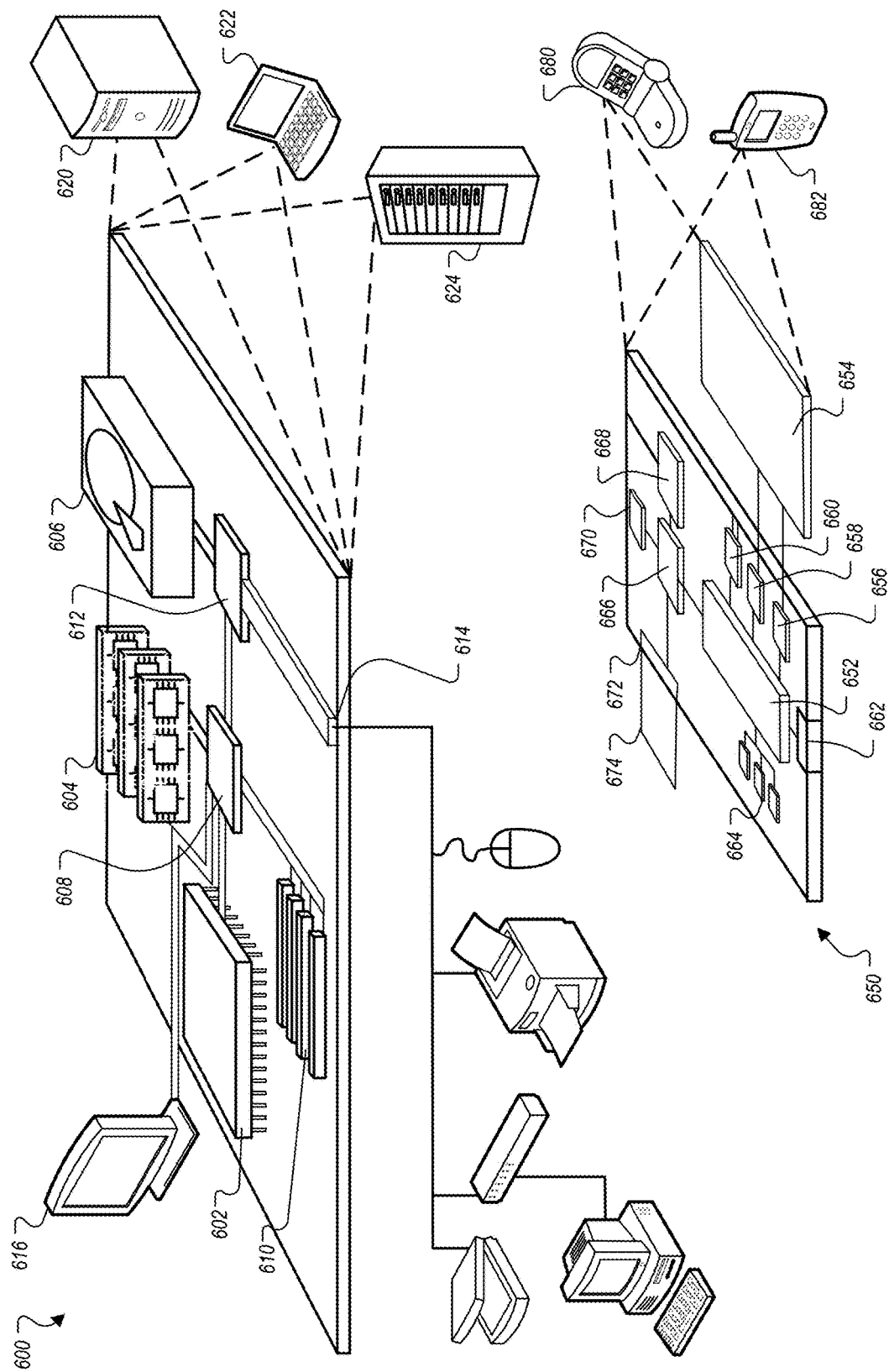
FIG. 6 is a block diagram of an example computer system that can be used to implement the methods, systems and processes described in this disclosure.

FIG. 6 is a block diagram of example computing devices 600, 650 that can be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent any other typically non-mobile devices, such as televisions or other electronic devices with one or more processors embedded therein or attached thereto. Computing device 650 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed controller 608 connecting to memory 604 and high-speed expansion ports 610, and a low-speed controller 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed bus 614. The low-speed bus 614 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as computing device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The computing device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the computing device 650, such as control of user interfaces, applications run by computing device 650, and wireless communication by computing device 650.

Processor 652 may communicate with a user through control interface 658 and display interface 656 coupled to a display 654. The display 654 may be, for example, a TFT LCD display or an OLED display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of computing device 650 with other devices. External interface 662 may provide, for example, for wired communication (e.g., via a docking procedure) or for wireless communication (e.g., via Bluetooth® or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to computing device 650 through expansion interface 672, which may include, for example, a subscriber identification module (SIM) card interface. Such expansion memory 674 may provide extra storage space for computing device 650, or may also store applications or other information for computing device 650. Specifically, expansion memory 674 may include instructions to carry out or supplement the processes described above, and may include secure information also. Thus, for example, expansion memory 674 may be provide as a security module for computing device 650, and may be programmed with instructions that permit secure use of computing device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Computing device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 668 (e.g., a radio-frequency transceiver). In addition, short-range communication may occur, such as using a Bluetooth®, WiFi, or other such transceiver (not shown). In addition, GPS receiver module 670 may provide additional wireless data to computing device 650, which may be used as appropriate by applications running on computing device 650.

Computing device 650 may also communicate audibly using audio codec 660, which may receive spoken information from a user and convert it to usable digital information. Audio codec 660 may likewise generate audible sound for a user, such as through a speaker, e.g., in a handset of computing device 650. Such sound may include sound from voice telephone calls, may include recorded sound (e.g., voice messages, music files, etc.) and may also include sound generated by applications operating on computing device 650.

The computing device 650 may be implemented in a number of different forms, as shown in the figure. For example, it may be implemented as a cellular telephone 680. It may also be implemented as part of a smartphone 682, personal digital assistant, or other mobile device.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a computer system comprising one or more computing devices and responsive to a search query from a user device, search operation output elements based on a search operation performed in response to the search query, wherein each search operation output element is an element for display in a search results environment in which search operation output elements responsive to the search query are displayed to a user of the user device, and are each individually selectable by the user;
determining, by the computer system, whether to provide an action indicator for each search operation output element, wherein the indicator is configured to be displayed concurrently with display of the search operation output element, wherein the indicator is indicative a user action relative to the search operation output element, and wherein determining whether to provide the action indicator for each search operation output element comprises determining whether to provide the action indicator for each search operation output based at least in part on a percentage of previous users that performed the user action after selecting the search operation output element during previous user sessions; and providing, by the computer system and to the user device for display in the search results environment, the search operation output elements, and for each search operation output element for which the action indicator is to be provided, indicator data for the search operation output element.

2. The computer-implemented method of claim 1, wherein determining whether to provide the action indicator for each search operation output based at least in part on the percentage of previous users that performed the user action after selecting the search operation output element during previous user sessions comprises determining whether the percentage of users that performed the user action exceeds a predetermined threshold.

3. The computer-implemented method of claim 1, wherein determining whether to provide the action indicator for each search operation output based at least in part on the percentage of previous users that performed the user action after selecting the search operation output element during previous user sessions further comprises determining whether the percentage of users that performed the user action is an outlier.

4. The computer-implemented method of claim 3, wherein determining whether the percentage of users that performed the user action is an outlier further comprises determining whether the percentage of users that performed the user action is greater than one standard deviation from a mean percentage of users that end up in that outcome for data describing other potential user actions.

5. The computer-implemented method of claim 1, wherein the user action comprises one of browsing related search results, saving a particular search result, sharing a particular search result, clicking to a host site related to a particular search result, and an amount of time spent on one particular search result.

6. The computer-implemented method of claim 1, wherein the search operation output elements are search results.

7. The computer-implemented method of claim 1, wherein the search operation output elements are search query suggestions.

8. A system, comprising:
a data processing apparatus; and
a non-transitory computer readable storage medium in data communication with the data processing apparatus and storing instructions executable by the data processing apparatus and upon such execution cause the data processing apparatus to perform operations comprising:
receiving, responsive to a search query from a user device, search operation output elements based on a search operation performed in response to the search query, wherein each search operation output element is an element for display in a search results environment in which search operation output elements responsive to the search query are displayed to a user of the user device, and are each individually selectable by the user;
determining whether to provide an action indicator for each search operation output element, wherein the indicator is configured to be displayed concurrently with display of the search operation output element, wherein the indicator is indicative of a user action relative to the search operation output element, and wherein determining whether to provide the action indicator for each search operation output element comprises determining whether to provide the action indicator for each search operation output based at least in part on a percentage of previous users that performed the user action after selecting the search operation output element during previous user sessions; and
providing, to the user device for display in the search results environment, the search operation output elements, and for each search operation output element for which the action indicator is to be provided, indicator data for the search operation output element.

9. The system of claim 8, wherein determining whether to provide the action indicator for each search operation output based at least in part on the percentage of previous users that performed the user action after selecting the search operation output element during previous user sessions comprises determining whether the percentage of users that performed the user action exceeds a predetermined threshold.

10. The system of claim 8, wherein determining whether to provide the action indicator for each search operation output based at least in part on the percentage of previous users that performed the user action after selecting the search operation output element during previous user sessions further comprises determining whether the percentage of users that performed the user action is an outlier.

11. The system of claim 10, wherein determining whether the percentage of users that performed the user action is an outlier further comprises determining whether the percentage of users that performed the user action is greater than one standard deviation from a mean percentage of users that end up in that outcome for data describing other potential user actions.

12. The system of claim 8, wherein the user action comprises one of browsing related search results, saving a particular search result, sharing a particular search result, clicking to a host site related to a particular search result, and an amount of time spent on one particular search result.

13. The system of claim 8, wherein the search operation output elements are search results.

14. The system of claim 8, wherein the search operation output elements are search query suggestions.

15. A non-transitory computer storage medium encoded with a computer program, the computer program comprising instructions that when executed by a data processing apparatus cause the data processing apparatus to perform operations comprising:
receiving, responsive to a search query from a user device, search operation output elements based on a search operation performed in response to the search query, wherein each search operation output element is an element for display in a search results environment in which search operation output elements responsive to the search query are displayed to a user of the user device, and are each individually selectable by the user;
determining whether to provide an action indicator for each search operation output element, wherein the action indicator is configured to be displayed concurrently with display of the search operation output element, wherein the action indicator is indicative of at least one of a user action relative to the search operation output element, and wherein determining whether to provide the action indicator for each search operation output element comprises determining whether to provide the action indicator for each search operation output based at least in part on a percentage of previous users that performed the user action after selecting the search operation output element during previous user sessions; and providing, to the user device for display in the search results environment, the search operation output elements, and for each search operation output element for which the action indicator is to be provided, indicator data for the search operation output element.

16. The non-transitory computer storage medium of claim 15, wherein determining whether to provide the action indicator for each search operation output based at least in part on the percentage of previous users that performed the user action after selecting the search operation output element during previous user sessions further comprises determining whether the percentage of users that performed the user action exceeds a predetermined threshold.

17. The non-transitory computer storage medium of claim 15, wherein determining whether to provide the action indicator for each search operation output based at least in part on the percentage of previous users that performed the user action after selecting the search operation output element during previous user sessions further comprises determining whether the percentage of users that performed the user action is an outlier.

18. The non-transitory computer storage medium of claim 17, wherein determining whether the percentage of users that performed the user action is an outlier further comprises determining whether the percentage of users that performed the user action is greater than one standard deviation from a mean percentage of users that end up in that outcome for data describing other potential user actions.

19. The non-transitory computer storage medium of claim 15, wherein the user action comprises of browsing related search results, saving a particular search result, sharing a particular search result, clicking to a host site related to a particular search result, and an amount of time spent on one particular search result.

20. The non-transitory computer storage medium of claim 15, wherein the search operation output elements are search results.

21. The non-transitory computer storage medium of claim 15, wherein the search operation output elements are search query suggestions.

\* \* \* \* \*